United States Patent
Oh et al.

(10) Patent No.: US 10,763,928 B2
(45) Date of Patent: Sep. 1, 2020

(54) METHOD AND APPARATUS FOR CONTROLLING BEAMFORMING

(71) Applicant: Samsung Electronics Co., Ltd., Gyeonggi-do (KR)

(72) Inventors: Jongho Oh, Gyeonggi-do (KR); Sunheui Ryoo, Gyeonggi-do (KR); Jungmin Yoon, Seoul (KR); Jung Ju Kim, Incheon (KR); Donghwi Roh, Seoul (KR); Sungrok Yoon, Seoul (KR); Ohyun Jo, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/568,631

(22) PCT Filed: Apr. 15, 2016

(86) PCT No.: PCT/KR2016/003968
§ 371 (c)(1),
(2) Date: Oct. 23, 2017

(87) PCT Pub. No.: WO2016/171434
PCT Pub. Date: Oct. 27, 2016

(65) Prior Publication Data
US 2018/0123665 A1    May 3, 2018

(30) Foreign Application Priority Data
Apr. 22, 2015    (KR) .................. 10-2015-0056688

(51) Int. Cl.
*H04B 7/06*    (2006.01)
*H04W 28/06*    (2009.01)
(Continued)

(52) U.S. Cl.
CPC ............ *H04B 7/0617* (2013.01); *H04B 7/06* (2013.01); *H04B 7/063* (2013.01); *H04B 7/0632* (2013.01);
(Continued)

(58) Field of Classification Search
CPC .... H04B 7/0617; H04B 7/088; H04B 7/0695; H04B 7/063; H04B 7/0632; H04B 7/06; H04W 72/085; H04W 74/08
See application file for complete search history.

(56) References Cited

U.S. PATENT DOCUMENTS

| | | | | |
|---|---|---|---|---|
| 6,804,238 B1* | 10/2004 | Euget | ...................... | H04L 29/06 370/392 |
| 2004/0076127 A1* | 4/2004 | Porte | ...................... | H04L 45/34 370/328 |

(Continued)

FOREIGN PATENT DOCUMENTS

| WO | WO 2012/103381 | 8/2012 |
|---|---|---|
| WO | WO 2014/182137 | 11/2014 |

OTHER PUBLICATIONS

Thomas Nitsche et al., IEEE 802.11ad: Directional 60 GHz Communication for Multi-Gigabit-per-Second Wi-Fi, IEEE Communications Magazine, Dec. 1, 2014, 10 pages.

(Continued)

*Primary Examiner* — Christine Ng
(74) *Attorney, Agent, or Firm* — The Farrell Law Firm, P.C.

(57) ABSTRACT

The present invention relates to techniques for a sensor network, machine-to-machine (M2M) communication, machine-type communication (MTC) and internet of things (IoT). The present invention may be applied to said technique-based intelligent services (such as smart home, smart building, smart city, smart or connected car, health care, digital education, retail business, and services associated (Continued)

with security and safety). A transmission apparatus of a wireless communication system according to an embodiment of the present invention comprises: a transmission unit for transmitting a compressed beacon frame by means of a plurality of transmission beams; a receiving unit for receiving information for the optimal transmission beam from among the plurality of transmission beams; and a control unit for controlling beamforming by means of a beam received from a terminal, wherein the data and header are compressed into a single frame in the compressed beacon frame.

15 Claims, 22 Drawing Sheets

(51) Int. Cl.
  *H04W 16/28*   (2009.01)
  *H04W 74/08*   (2009.01)
  *H04B 7/08*   (2006.01)
  *H04W 72/08*   (2009.01)

(52) U.S. Cl.
  CPC .......... *H04B 7/0695* (2013.01); *H04B 7/088* (2013.01); *H04W 16/28* (2013.01); *H04W 28/06* (2013.01); *H04W 72/085* (2013.01); *H04W 74/08* (2013.01)

(56) References Cited

U.S. PATENT DOCUMENTS

| | | | | |
|---|---|---|---|---|
| 2005/0036499 A1* | 2/2005 | Dutt | ................... | H04L 67/1097 370/401 |
| 2010/0202476 A1* | 8/2010 | Chun | ................... | H04W 28/06 370/477 |
| 2010/0329232 A1* | 12/2010 | Tubb | ................... | E05B 39/00 370/345 |
| 2012/0236862 A1* | 9/2012 | Furuta | ................... | H04L 69/04 370/392 |
| 2012/0287850 A1* | 11/2012 | Wentink | ............ | H04W 52/0216 370/328 |
| 2013/0039345 A1* | 2/2013 | Kim | ................... | H04W 72/046 370/332 |
| 2013/0089000 A1 | 4/2013 | Hansen et al. | | |
| 2013/0177001 A1 | 7/2013 | Abraham et al. | | |
| 2013/0301454 A1 | 11/2013 | Seol et al. | | |
| 2013/0329712 A1* | 12/2013 | Cordeiro | .............. | H04B 7/0617 370/338 |
| 2014/0078949 A1* | 3/2014 | Chu | ................... | H04W 52/0219 370/311 |
| 2014/0105098 A1 | 4/2014 | Chu et al. | | |
| 2014/0206304 A1 | 7/2014 | Zhang et al. | | |
| 2014/0241226 A1* | 8/2014 | Jia | ........................ | H04W 48/14 370/311 |
| 2014/0369330 A1* | 12/2014 | Sinha | .................... | H04W 8/005 370/338 |
| 2016/0119902 A1 | 4/2016 | Cheong et al. | | |
| 2017/0064583 A1* | 3/2017 | Roy | .................. | H04W 36/0005 |

OTHER PUBLICATIONS

European Search Report dated Apr. 10, 2018 issued in counterpart application No. 16783367.2-1220, 11 pages.
PCT/ISA/210 Search Report issued on PCT/KR2016/003968 (pp. 4).
PCT/ISA/237 Written Opinion issued on PCT/KR2016/003968 (pp. 7).
IEEE Std 802.11ad—2012, IEEE Standard for Information technology—Telecommunications and information exchange between systems, Local and metropolitan area networks—Specific requirements, Part 11: Wirelesss LAN Medium Access Control (MAC) and Physical Layer (PHY) Specifications, Amendment 3: Enhancements for Very High Throughput in the 60GHz band, IEEE Computer Society, Dec. 28, 2012, pp. 628.
European Search Report dated Feb. 6, 2020 issued in counterpart application No. 16783367.2-1220, 18 pages.

* cited by examiner

METHOD AND APPARATUS FOR CONTROLLING BEAMFORMING

PRIORITY

This application is a National Phase Entry of International Application No. PCT/KR2016/003968, filed on Apr. 15, 2016, and claims priority to Korean Patent Application No. 10-2015-00556688, filed on Apr. 22, 2015, the contents of each of which are incorporated herein by reference.

TECHNICAL FIELD

The present disclosure relates to the control of beamforming.

BACKGROUND ART

The Internet is evolving from a human-oriented connection network, in which humans generate and consume information, to the Internet of Things (IoT) network in which distributed elements, such as objects and the like, exchange and process information. Internet of Everything (IoE) technology, in which big-data processing technology is combined with the IoT technology through connection with a cloud server or the like, has emerged. In order to implement the IoT, technical factors such as a sensing technique, wired/wireless communication, network infrastructure, service interface technology, and security technology are required, and thus technologies such as a sensor network, Machine-to-Machine (M2M) communication, Machine-Type Communication (MTC), and the like for connection between objects are being researched these days.

In an IoT environment, through collection and analysis of data generated in connected objects, an intelligent Internet Technology (IT) service that creates new value in people's lives may be provided. The IoT may be applied to fields such as those of a smart home, smart building, smart city, smart car, connected car, smart grid, health care, smart home appliance, or high-tech medical service, through convergence of conventional Information Technology (IT) with various industries.

Recently, discussion has been actively conducted on wireless communication technology that operates in an ultra-high-frequency band. For example, the Institute of Electrical and Electronics Engineers (IEEE) 802.11ad standard is a multi-gigabit-speed wireless communication technology that operates at a frequency band of 60 gigahertz (GHz). This wireless communication technology uses beamforming technology for transmitting or receiving a signal more efficiently.

DETAILED DESCRIPTION OF THE INVENTION

Technical Problem

Therefore, an embodiment of the present disclosure provides an apparatus and method for controlling beamforming in a wireless communication system.

Another embodiment of the present disclosure provides an apparatus and method for transmission or reception according to a beacon frame in a wireless communication system.

Still another embodiment of the present disclosure provides an apparatus and method for determining an optimum transmission/reception beam in a wireless communication system.

Technical Solution

A transmission device of a wireless communication system according to an embodiment of the present disclosure includes a transmission unit that transmits a compressed beacon frame by using a plurality of transmission beams, a reception unit that receives information on an optimum transmission beam among the plurality of transmission beams, and a control unit that controls beamforming by using a beam received from a terminal, in which data and a header are compressed into a single frame in the compressed beacon frame.

A transmission method of a wireless communication system according to an embodiment of the present disclosure includes transmitting a compressed beacon frame by using a plurality of transmission beams, receiving information on an optimum transmission beam among the plurality of transmission beams, and controlling beamforming by using a beam received from a terminal, in which data and a header are compressed into a single frame in the compressed beacon frame.

A reception device of a wireless communication system according to an embodiment of the present disclosure includes a reception unit that receives a compressed beacon frame by using a plurality of transmission beams, a transmission unit that transmits information on an optimum transmission beam for the compressed beacon frame by means of a compressed feedback frame, and a control unit that controls beamforming by using a beam received from a base station, in which data and a header are compressed into a single frame in the compressed feedback frame.

A reception method of a wireless communication system according to an embodiment of the present disclosure includes receiving a compressed beacon frame by using a plurality of transmission beams, transmitting information on an optimum transmission beam for the compressed beacon frame by means of a compressed feedback frame, and controlling beamforming by using a beam received from a base station, in which data and a header are compressed into a single frame in the compressed feedback frame.

Advantageous Effects

According to an embodiment of the present disclosure, it is possible to shorten the time for performing beamforming, and it is thus possible to overcome coverage restriction, restriction of the number of mobility support terminals, and restriction on movement speed.

MODE FOR CARRYING OUT THE INVENTION

Hereinafter, exemplary embodiments of the present disclosure will be described in detail with reference to the accompanying drawings. Further, in the following description of the present disclosure, a detailed description of known functions and configurations incorporated herein will be omitted when the same may make the subject matter of the present disclosure rather unclear.

Hereinafter, the present disclosure describes a technology for controlling a content. In the following description, a small base station includes a base station of a small cell, which supports transmission or reception in an ultra-high frequency band, for example, a 60 gigahertz (GHz) band. Further, a terminal (user equipment) may include at least one electronic device selected from among a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), an MP3 player, a mobile medical appliance, a camera, and a wearable device (e.g., a head-mounted-device (HMD) such as electronic glasses, electronic clothes, an electronic bracelet, an electronic necklace, an electronic accessory, electronic tattoos, or a smart watch).

Figure 1:
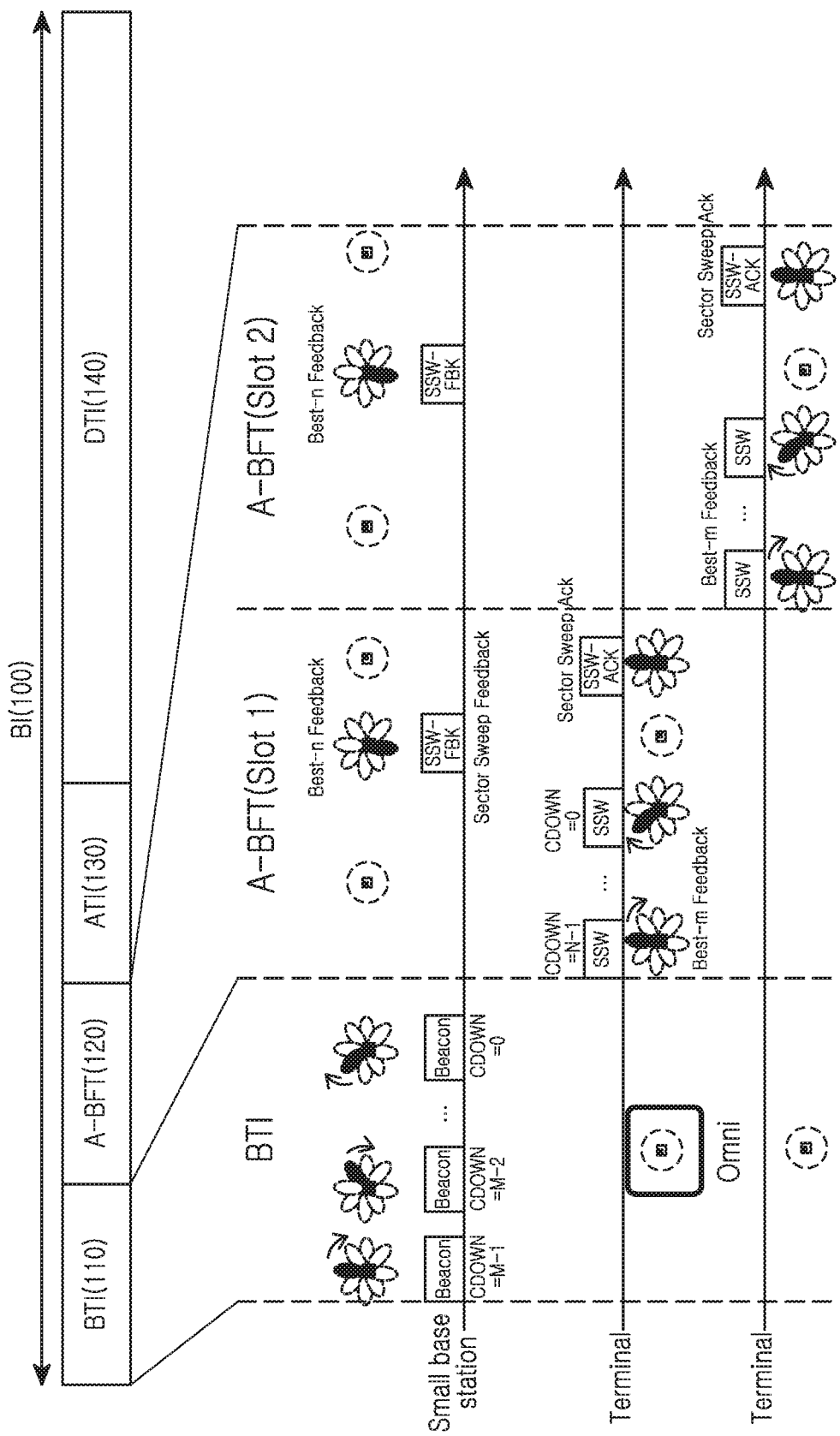
FIG. 1 illustrates a beamforming performance operation in a wireless communication system.

FIG. 1 illustrates a beamforming performance operation in a wireless communication system. For example, FIG. 1 illustrates a beamforming performance operation according to the IEEE 802.11ad standard.

Referring to FIG. 1, one Beacon Interval (BI) 100 includes a Beacon Transmission Interval (BTI) 110, an association Beamforming Training (A-BFT) interval 120, an Announcement Transmission Interval (ATI) 130, and a Data Transfer Interval (DTI) 140. In the BTI 110 and the A-BFT 120 within the BI 100, a small base station and a number of terminals (UEs) perform initial beamforming. In the BTI 110, a 60-GHz small cell, i.e., the small base station, transmits a directional beacon, and each of the terminals receives the directional beacon via an omni-pattern antenna and searches for an optimum transmission beam of the 60-GHz small cell. In the present disclosure, an example of a 60-GHz band among millimeter waves (mmWaves) is used, where an access point (AP) is referred to as a small cell. In the A-BFT 120 interval, the terminals perform random-access to receive slots allocated thereto, and only a terminal to which the slot is allocated exchanges a signal with the small base station. The terminal to which the slot is allocated adds information of the optimum transmission beam of the small cell, which is found in the BTI 100 interval, in a Sector Sweep (SSW) frame and performs directional transmission, and the small cell receives the SSW frame via an omni-pattern antenna, recognizes its own optimum transmission beam, and concurrently searches for an optimum transmission beam of the terminal. Then, the small cell adds information of the optimum transmission beam of the terminal in an SSW feedback frame and transmits the SSW feedback frame via its own optimum transmission beam, and the terminal receives the SSW feedback frame via the omni-pattern antenna and recognizes its own transmission beam. Finally, the terminal transmits an SSW Acknowledge (ACK) via its own optimum transmission beam, and the small cell receives the SSW ACK via the omni-pattern antenna.

In an IEEE 802.11ad system, the number of slots in the A-BFT interval is limited to eight. Accordingly, the number of terminals that can support beamforming within one BI is limited to eight. In addition, when the BI is shortened in order to support a high movement speed, the time of the BTI and the time of the A-BFT relative to the time of the BI are excessively long, and deterioration of a throughput rate thus becomes serious. Therefore, a solution is needed to solve this problem.

Figure 2:
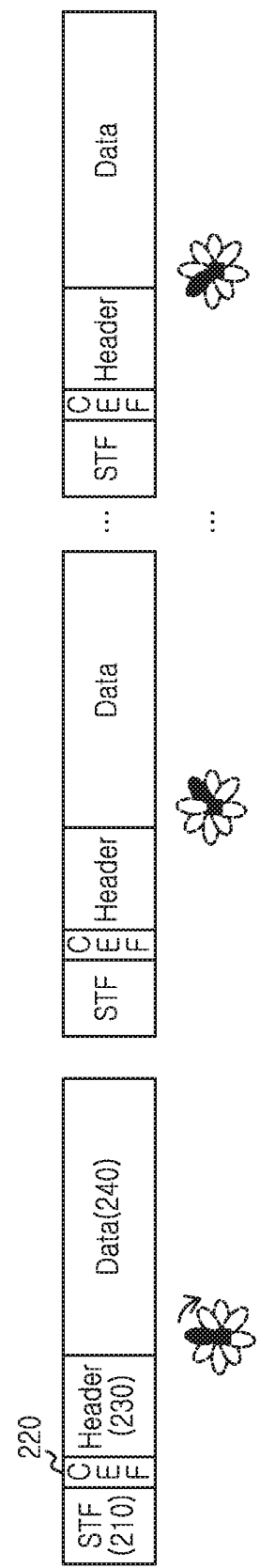
FIG. 2 illustrates an example of a beacon frame in a wireless communication system.

FIG. 2 illustrates an example of a beacon frame in a wireless communication system. For example, this beacon frame may be the beacon frame transmitted by the base station in the BTI 110 illustrated in FIG. 1.

Referring to FIG. 2, beacon frame information in a wireless communication system includes A Short Training Field (STF) 210, a Channel Estimation Field (CEF) 220, a header 230, and data 240. The STF 210 may be used for synchronization, and the CEF 220 may perform channel estimation.

In the following description of FIG. 3, an embodiment of the present disclosure may use a compressed beacon frame structure that changes the frame information. The compressed beacon frame structure may reduce the length of the frame, and accordingly, the Beacon Transmission Interval (BTI) and the interval of the Association Beamforming training (A-BFT), which are illustrated in FIG. 1, may be reduced.

Figure 3:
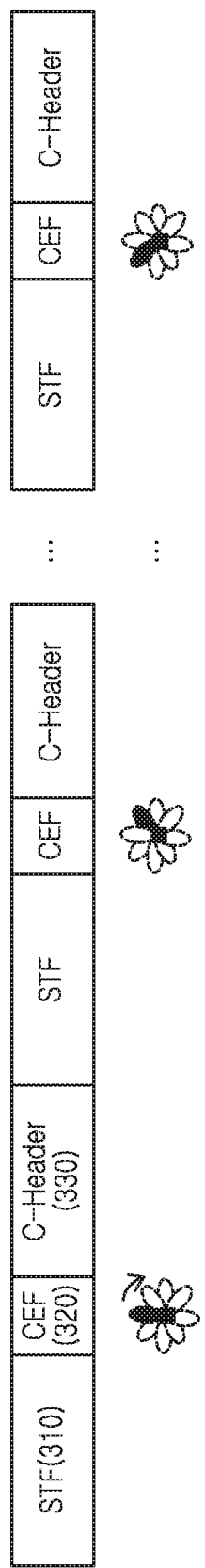
FIG. 3 illustrates an example of compressed beacon frame information according to an embodiment of the present disclosure.

FIG. 3 illustrates an example of compressed beacon frame information according to an embodiment of the present disclosure.

Referring to FIG. 3, the compressed beacon frame according to an embodiment of the present disclosure may include a Short Training Field (STF) 310, a Channel Estimation Field (CEF) 320, and a C-header 330. The compressed beacon frame has a structure in which a block including the STF 310, the CEF 320, and the C-header 330 is repeated. The STF 310 is used for synchronization, and the CEF 320 is used for estimating a channel. The C-header 330 according to an embodiment of the present disclosure has a structure in which the header and the data illustrated in FIG. 2 are compressed into one. The compressed beacon frame according to an embodiment of the present disclosure may be configured to have a shorter length than a conventional beacon by using the C-header 330 and by removing an interval when a beam direction is changed (swept). In addition, according to an embodiment of the present disclosure, it may be possible to reduce the length of the Sector Sweep (SSW) frame in the A-BFT interval by using not only the compressed beacon frame but also a compressed feedback frame in the A-BFT interval.

Figure 4:
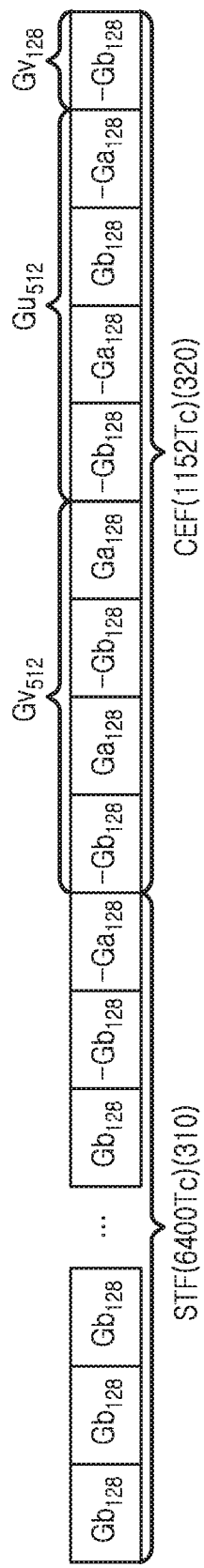
FIG. 4 illustrates an example of Golay sequence information according to an embodiment of the present disclosure.

FIG. 4 illustrates an example of Golay sequence information according to an embodiment of the present disclosure.

Referring to FIG. 4, since the configuration of the frame uses a control PHY of the IEEE 802.11ad standard, the STF may be read by an existing device. The configuration of the beacon frame and the feedback frame according to an embodiment of the present disclosure may be achieved by arranging a Golay code differently from a Golay code of a conventional configuration. FIG. 4 shows a Golay code for the STF 310 and the CEF 320 of FIG. 3. The frame according to an embodiment of the present disclosure may change a Golay code sequence combination in order to reduce the influence of interference due to simultaneous transmission in a multi-cell environment. The Golay code sequence in FIG. 4 includes the arrangement of a sequence of Gv512 and Gu512, not the conventional arrangement of a sequence of Gu512 and Gv512. Due to the sequence arrangement of the Gv512 and Gu512, the frame according to an embodiment of the present disclosure may enable automatic detection so as to indicate the presence of the C-header immediately following the CEF in advance.

Embodiments of the present disclosure may use a compressed beacon frame and a compressed feedback frame. The compressed beacon frame and the compressed feedback frame may include compressed information compared to a conventional DMG beacon frame.

TABLE 1 below shows a conventional DMG beacon frame.

TABLE 1

| Frame Control | Duration | BSSID | Body | FCS |
| --- | --- | --- | --- | --- |

Referring to TABLE 1, the DMG beacon frame includes frame control, duration, Basic Service Set ID (BSSID), body, and Frame Check Sequence (FCS). Here, a body part may include information shown in TABLE 2 below.

TABLE 2

| Order | Information |
| --- | --- |
| 1 | Timestamp |
| 2 | Sector Sweep |
| 3 | Beacon Interval |
| 4 | Beacon Interval Control |
| 5 | DMG parameters |
| 6 | Clustering Control |
| 7 | DMG Capabilities |
| 8 | Extended Schedule |
| 9 | RSN |
| 10 | Multiple BSSID |
| 11 | DMG Operation |
| 12 | Next DMG ATI |
| 13 | DMG BSS parameter change |
| 14 | Multi-band |
| n − 1 | One or more of resource-related information and capacity-related information |
| Last(n) | Vendor Specific |

Referring to FIG. 2, the body part of the DMG beacon frame may include timestamp, sector sweep, beacon interval, beacon interval control, DMG parameter, clustering control, DMG capability, extended schedule, Robust Security Network (RSN), multiple BSSID, DMG operation, subsequent DMG Announcement Transmission Interval (ATI), DMG BSS parameter change, and multi-band, one or more of resource- and capacity-related information elements, and vendor-specific information.

Figure 5:
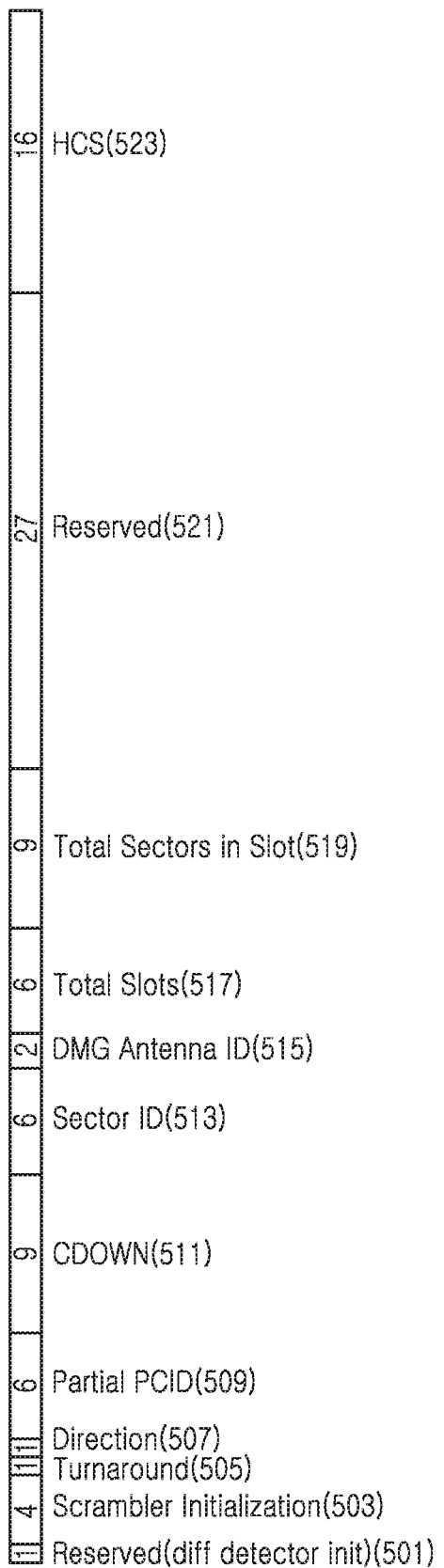
FIG. 5 illustrates an example of header information included in compressed beacon frame information according to an embodiment of the present disclosure.

FIG. 5 illustrates an example of header information included in compressed beacon frame information according to an embodiment of the present disclosure.

According to an embodiment of the present disclosure, the compressed beacon frame may use scrambling for multi-cell support.

The header information in FIG. 5 may include fields in a sequence of a 1-bit reserved bit 501, a 4-bit scrambler initialization field 503, a 1-bit conversion field (turnaround) 505, a 1-bit direction field 507 capable of distinguishing whether the C-header of the compressed beacon is for uplink or downlink, a 6-bit partial PCID field 509 indicating a physical cell ID of the 60-GHz small cell, a 9-bit CDOWN field 511 indicating the number of remaining sectors, a 6-bit sector ID field 513 indicating the currently used sector, a 2-bit DMG antenna ID field 515 indicating the antenna to be used, a 6-bit total slot field (total slots) 517 indicating the total number of slots of the A-BFT, a 9-bit total sector field in slot 519, a 27-bit reserved field 521, and a 16-bit HCS field 523.

According to an embodiment of the present disclosure, by using the compressed beacon frame, necessary information of a plurality of fields including beacon interval control and BSSID in a conventional frame is reduced and used for the C-header, whereby it may be possible to reduce data overhead.

Figure 6:
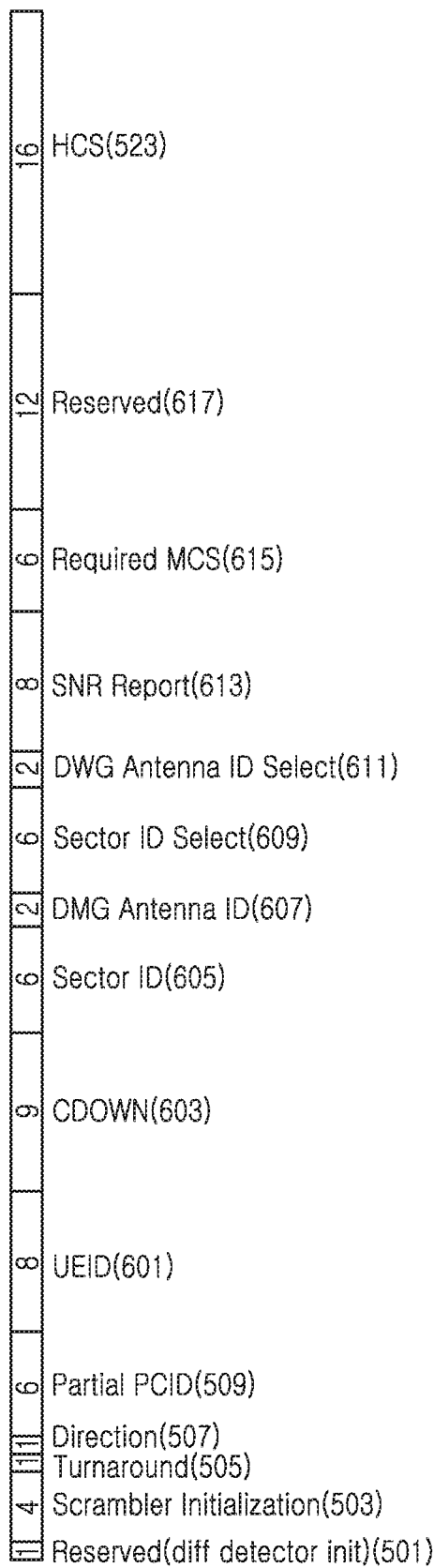
FIG. 6 illustrates an example of header information included in feedback frame information according to an embodiment of the present disclosure.

FIG. 6 illustrates an example of header information included in feedback frame information according to an embodiment of the present disclosure.

Referring to FIG. 6, the configuration of the feedback frame during the A-BFT interval may be different from the configuration of the compressed beacon frame in FIG. 5.

Header information of FIG. 6 includes the 1-bit reserved bit 501, the 4-bit scrambler initialization field 503, the 1-bit conversion field (turnaround) 505, the 1-bit direction field 507 capable of distinguishing whether the C-header of the compressed beacon is for uplink or downlink, the 6-bit partial PCID field 509 indicating the physical cell ID of the 60-GHz small cell, and the 6-bit partial PCID field 509 indicating the physical cell ID of the 60-GHz small cell.

Unlike FIG. 5, in the header information of FIG. 6, an 8-bit terminal ID field (UEID) 601 indicating a terminal ID is arranged before a 9-bit CDOWN field indicating the number of remaining sectors, but a CDOWN field 603, a section ID field 605, and a DMG antenna ID field 607 are arranged in the same sequence as that of FIG. 5. Further, unlike FIG. 5, in the header information of FIG. 6, after the DMG antenna ID field 607, a sector ID selection field (sector ID select) 609 indicating a selected ID, a DWG antenna ID selection field (DWG Antenna ID select) 611, an 8-bit SNR report field (SNR report) 613 indicating an SNR of a received signal, a 6-bit MCS request field (Required MCS) 615 indicating the MCS to be used for downlink, a 12-bit reserved field 617, and the 16-bit HCS field 523 are included.

As a result, the information included in the feedback frame information overlaps with the information included in DMG beacon data of the header information, and the frame control, the duration, and the FCS overlap with the beacon frame information.

Further, a beacon interval is not used for a fixed operation, and necessary information among beacon interval control, BSSID, SSW field, and SSW feedback field of a conventional frame is reduced and used for the C-header, whereby it may be possible to reduce data overhead.

According to an embodiment of the present disclosure, the C-header may use 24-spreading.

The arrangement of the compressed beacon frame in FIG. 5 and the arrangement of the compressed feedback frame in FIG. 6 are shown in TABLE 3 below.

TABLE 3

| Bit | Compressed Beacon Frame | Bit | Compressed Feedback Frame |
|---|---|---|---|
| 1 | Reserved | 1 | Reserved |
| 4 | Scrambler | 4 | Scrambler |
| 1 | Turnaround | 1 | Turnaround |
| 1 | Direction | 1 | Direction |
| 6 | Partial PCID | 6 | Partial PCID |
| 9 | CDOWN | 8 | UEID |
|   |   | 9 | CDOWN |
| 6 | Sector ID |   |   |
| 2 | DMG Antenna ID |   |   |
| 6 | Total Slots | 6 | Sector ID |
| 9 | Total Sectors in Slot | 2 | DMG Antenna ID |
|   |   | 6 | Sector ID Select |
|   |   | 2 | DWG Antenna ID Select |
| 27 | Reserved | 8 | SNR Report |
|   |   | 6 | Required MCS |
|   |   | 12 | Reserved |
| 16 | HCS | 16 | HCS |

Figure 7:
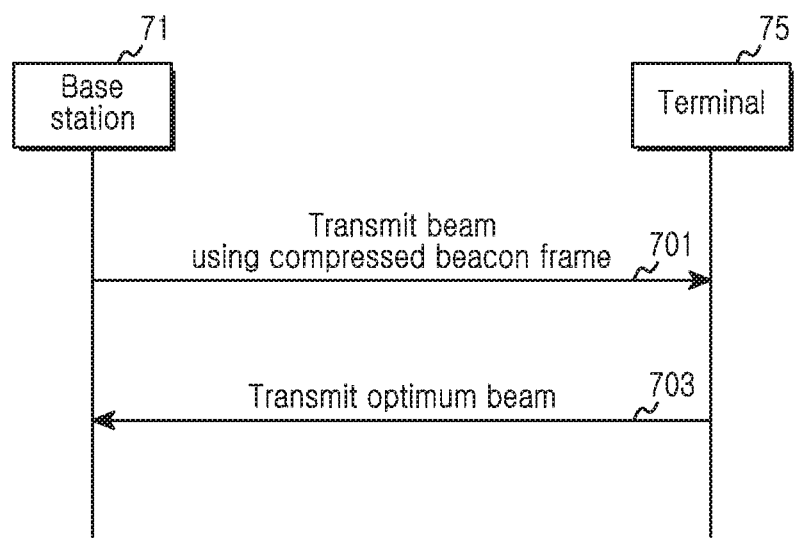
FIG. 7 illustrates the flow of a beamforming operation between a small base station and a terminal according to an embodiment of the present disclosure.

FIG. 7 illustrates the flow of a beamforming operation between a small base station and a terminal according to an embodiment of the present disclosure.

Referring to FIG. 7, in step 701, a small base station 71 performs beam transmission using a compressed beacon frame. The small base station 71 according to an embodiment of the present disclosure performs directional transmission using the compressed beacon frame instead of a conventional beacon.

In step 703, a terminal 75 may receive the compressed beacon frame in an omni-antenna pattern according to the conventional IEEE 802.11ad standard. After finding an optimum transmission beam of the small base station by using the compressed beacon, the terminal 75 transmits the optimum transmission beam for the beam at block 703.

Hereinafter, a specific operation of the small base station 71 and the terminal 75, illustrated in FIG. 7, will be described.

Figure 8:
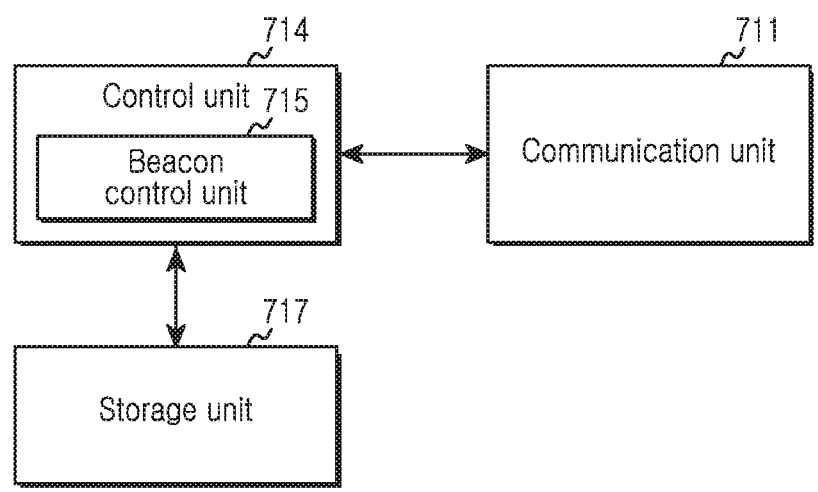
FIG. 8 illustrates the block configuration of a device of a base station according to an embodiment of the present disclosure.

FIG. 8 illustrates the block configuration of a device of a base station according to an embodiment of the present disclosure. For example, the device of the base station may be the small base station 71 illustrated in FIG. 7.

Referring to FIG. 8, the base station 71 includes a communication unit 711, a control unit 714, and a storage unit 717. Here, although the base station includes only the communication unit 711, the control unit 714, and the storage unit 717 for convenience of explanation, the scope of the present disclosure is not limited thereto, and various embodiments are possible without departing from the scope of the present disclosure.

The communication unit 711 performs a function for transmitting or receiving a signal through a wireless channel, such as band conversion and amplification of a signal. For example, the communication unit 711 may include a transmission filter, a reception filter, an amplifier, a mixer, an oscillator, a Digital-to-Analog Converter (DAC), an Analog-to-Digital Converter (ADC), and the like. The communication unit 711 according to an embodiment of the present disclosure may transmit or receive a beacon frame. Particularly, the communication unit 711 according to an embodiment of the present disclosure may transmit a compressed beacon frame and receive a feedback frame. In some embodiments, the communication unit 711 may transmit an optimum transmission beam of a transmission device and a channel quality indicator (CQI) by using a single compressed feedback frame. The communication unit 711 may be referred to as a transmission unit, a reception unit, a transmission/reception unit, or a communication unit.

The control unit 714 controls the overall operation of a device for controlling beamforming. The control unit 714 includes a beacon control unit 715. The beacon control unit 715 controls, for example, the device for controlling beamforming in order to perform the procedure illustrated in FIG. 9 below. According to an embodiment of the present disclosure, the operation of the control unit 714 is as follows.

The control unit 714 may control the transmission unit to perform directional transmission in each direction by using the compressed beacon frame. The transmission unit may be the communication unit 711. Further, the control unit 714 may determine an optimum transmission beam of the terminal and an optimum transmission/reception beam of the small base station by using feedback information received from the terminal.

The control unit 714 may control the transmission unit to repeatedly transmit beams in all directions for each slot. The transmission unit may be the communication unit 711.

The storage unit 717 may store necessary values of the device for controlling beamforming. According to an embodiment of the present disclosure, the storage unit 717 may store information on the optimum transmission beam.

Figure 9:
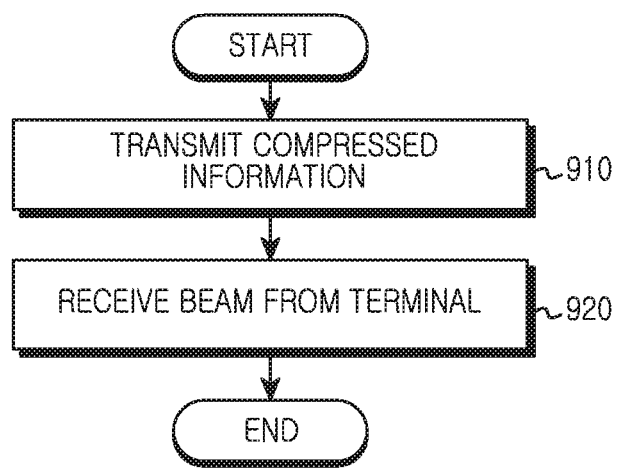
FIG. 9 illustrates the flow of an optimum transmission beam search operation using a compressed beacon frame according to an embodiment of the present disclosure.

FIG. 9 illustrates the flow of an optimum transmission beam search operation using a compressed beacon frame according to an embodiment of the present disclosure.

In step 910 of FIG. 9, the small base station 71 performs directional transmission using a compressed beacon frame according to an embodiment of the present disclosure. The small base station 71 performs directional transmission in each direction by using the compressed beacon frame. When the small base station 71 transmits a signal, the terminal 75 may receive the signal in an omni-antenna pattern and then search for an optimum transmission beam based on the received signal.

In step 920, the small base station 71 may receive information on the optimum transmission beam transmitted from the terminal 75.

Figure 10:
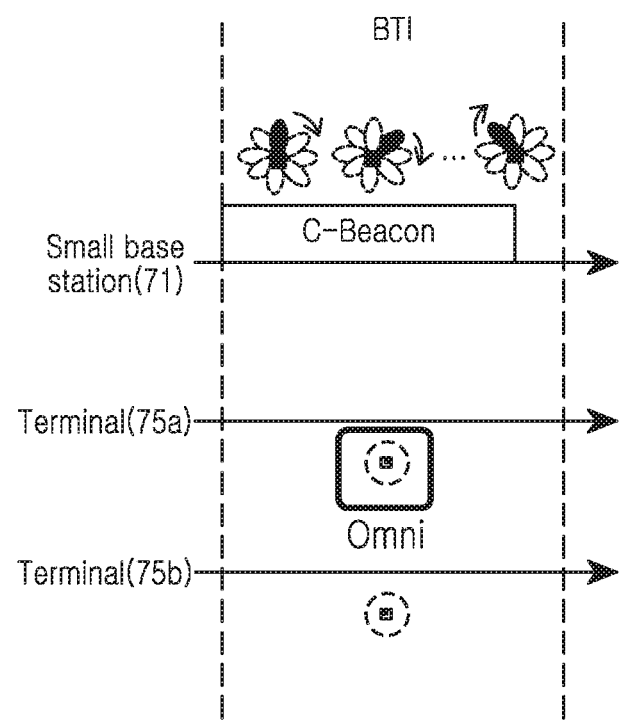
FIG. 10 illustrates an example of an operation between a small base station and a terminal, using a compressed beacon frame according to an embodiment of the present disclosure.

FIG. 10 illustrates an example of an operation between a small base station and a terminal, using a compressed beacon frame according to an embodiment of the present disclosure.

Referring to FIG. 10, the small base station 71 performs directional transmission using a compressed beacon frame according to an embodiment of the present disclosure. The small base station 71 performs directional transmission in each direction in the BTI interval by using the compressed beacon frame. When the small base station 71 transmits a signal, a terminal 75a may receive the signal in an omni-antenna pattern and then search for an optimum transmission beam based on the received signal. Like the terminal 75a, a terminal 75b may also receive the signal in an omni-antenna pattern and then search for an optimum transmission beam based on the received signal.

Figure 11:
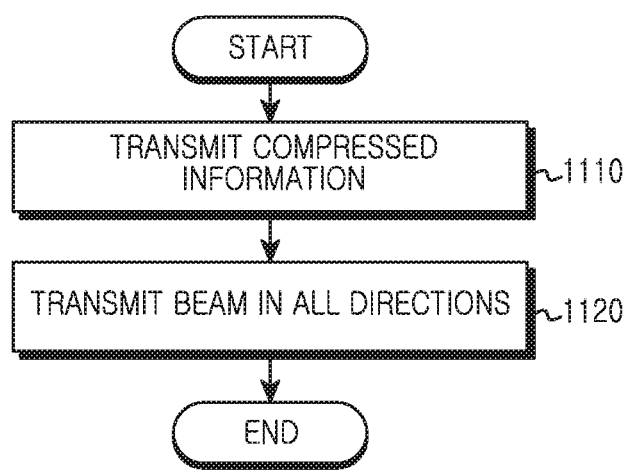
FIG. 11 illustrates the flow of a small base station operation using a compressed beacon frame according to an embodiment of the present disclosure.

FIG. 11 illustrates the flow of a small base station operation using a compressed beacon frame according to an embodiment of the present disclosure.

Referring to FIG. 11, in step 1110, the small base station 71 transmits a compressed beacon frame according to an embodiment of the present disclosure to the terminal. According to an embodiment of the present disclosure, the small base station 71 may expand downlink coverage in the BTI interval by using the compressed beacon frame. The small base station 71 allocates slots to correspond to the maximum number of beams of the terminals 75a and 75b, and performs directional transmission using the compressed beacon frame for each slot. As the directional transmission is performed, the terminals 75a and 75b synchronize received beams to the start points of the slots and steer the received beams.

In step 1120, the small base station 71 repeatedly transmits beams possessed by all terminals 75 in all directions for each slot (Full Sweep). At this time, the terminals 75a and 75b may receive the compressed beacon frame for all the received beams, and accordingly, may find an optimum transmission beam of the small base station 71 and their own optimum reception beams.

According to an embodiment of the present disclosure, an interval of a conventional beacon frame may be shortened using a compressed beacon (for example, one shortened from 100 ms to 20 ms). The use of such a compressed beacon may support the mobility of a rapidly moving terminal.

Figure 12:
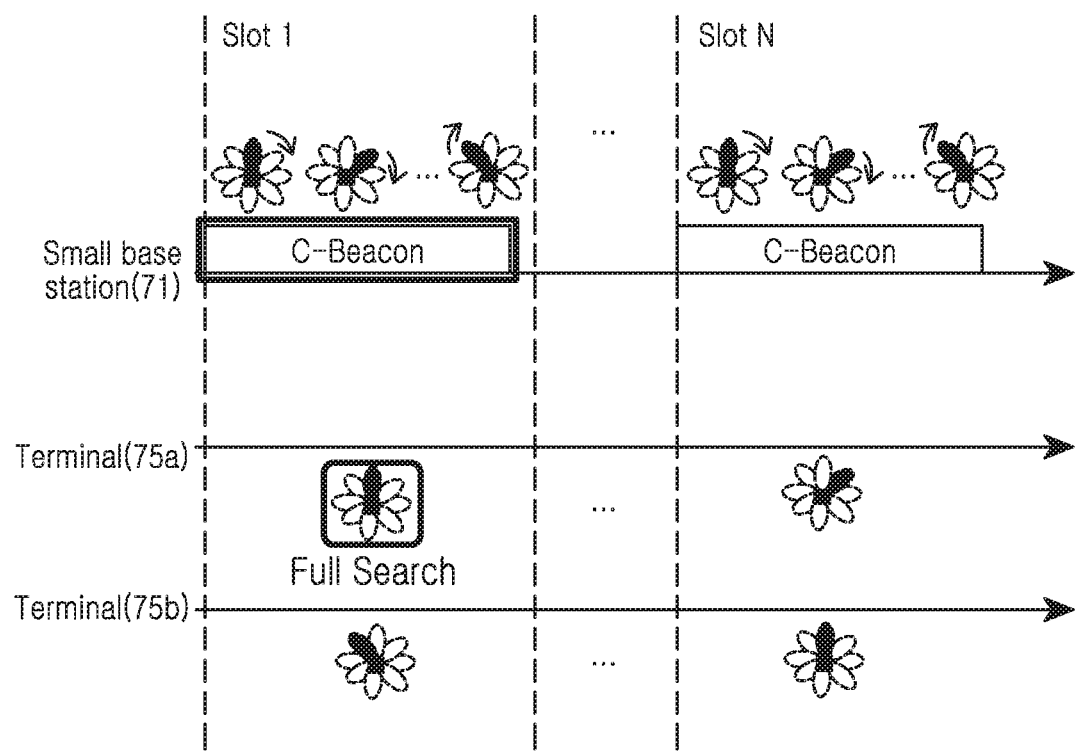
FIG. 12 illustrates an operation between a small base station and a terminal according to an embodiment of the present disclosure.

FIG. 12 illustrates an operation between a small base station and a terminal according to an embodiment of the present disclosure.

Referring to FIG. 12, the small base station 71 transmits a compressed beacon frame according to an embodiment of the present disclosure to the terminal. According to an embodiment of the present disclosure, the small base station 71 may expand downlink coverage in the BTI interval by using directional transmission of the compressed beacon frame. The small base station 71 allocates slots to correspond to the maximum number of beams of the terminals 75a and 75b, and performs transmission in multiple directions by using the compressed beacon frame for each slot. As the directional transmission is performed, the terminals 75a and 75b synchronize received beams to the start points of the slots and steer the received beams. The small base station 71 repeatedly transmits beams possessed by all terminals 75 in all directions for each slot (Full Sweep). The terminals 75 may find an optimum transmission beam of the small base station 71 and their own optimum reception beams, through the beam transmission in all directions.

Figure 13:
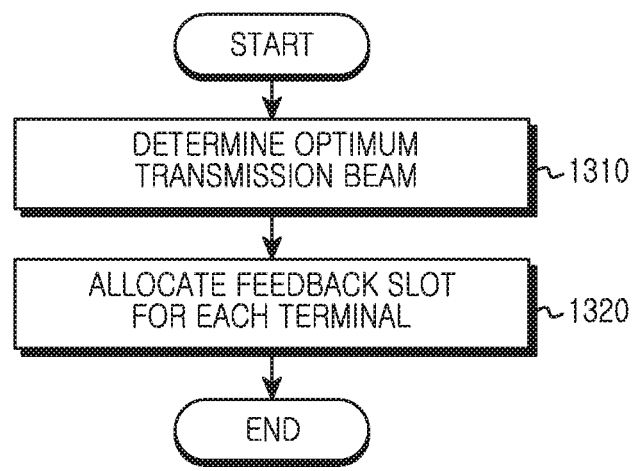
FIG. 13 illustrates the flow of a small base station operation when a terminal acquires optimum reception beam information in advance in a BTI interval according to an embodiment of the present disclosure.

FIG. 13 illustrates the flow of a small base station operation when a terminal acquires optimum reception beam information in advance in a BTI interval according to an embodiment of the present disclosure.

FIG. 13 corresponds to another example of a method for enabling the expansion of uplink coverage when the terminals 75 have already determined optimum reception beams in the BTI interval. In step 1310, the terminals 75a and 75b transmit optimum transmission beam information of the small base station 71, a channel quality indicator (CQI), and the like by using the optimum reception beams, and the small base station 71 determines an optimum transmission beam of the small base station 71 while performing synchronized directional reception.

In step 1320, the small base station 71 allocates a feedback slot for each terminal. When time division is used, the small base station 71 may schedule a feedback time for each terminal 75 or use a random-access scheme, and may use frequency division.

Figure 14:
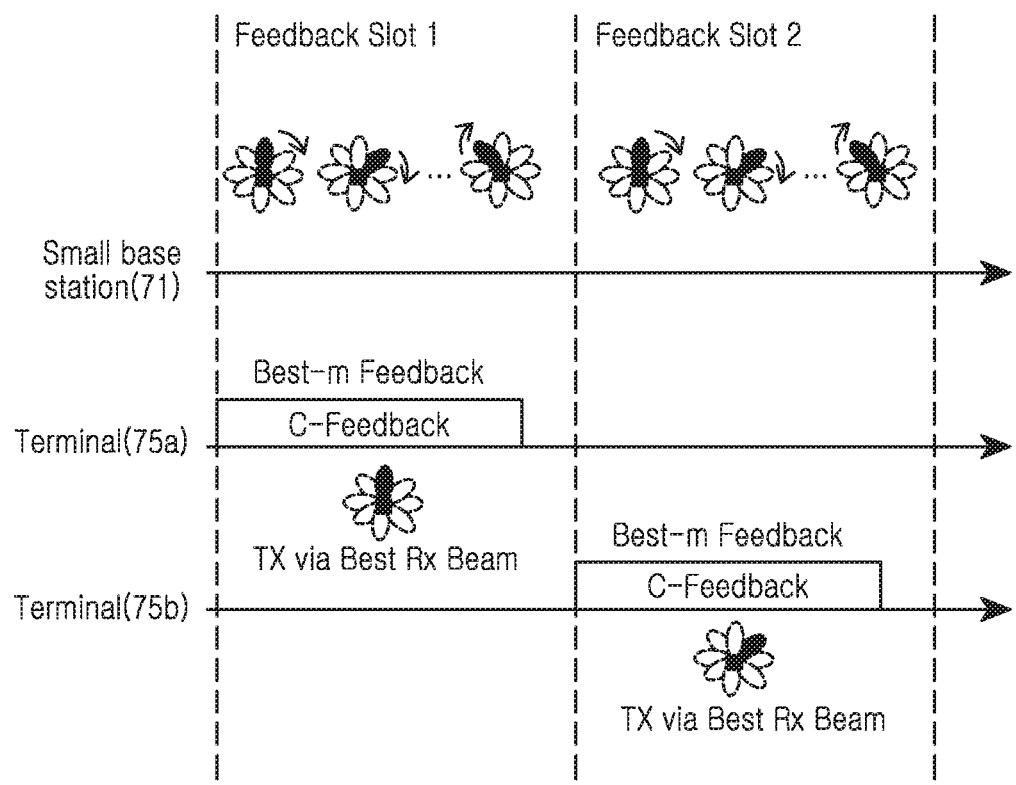
FIG. 14 illustrates an operation between a small base station and a terminal when the terminal acquires optimum reception beam information in advance in a BTI interval according to an embodiment of the present disclosure.

FIG. 14 illustrates an operation between a small base station and a terminal when the terminal acquires optimum reception beam information in advance in a BTI interval according to an embodiment of the present disclosure.

Terminals 75a and 75b transmit optimum transmission beam information of the small base station 71, a channel quality indicator (CQI), and the like by using optimum reception beams, and the small base station determines an optimum transmission beam of the small base station 71 while performing synchronized directional reception. At this time, the small base station 71 allocates a feedback slot for each terminal.

Figure 15:
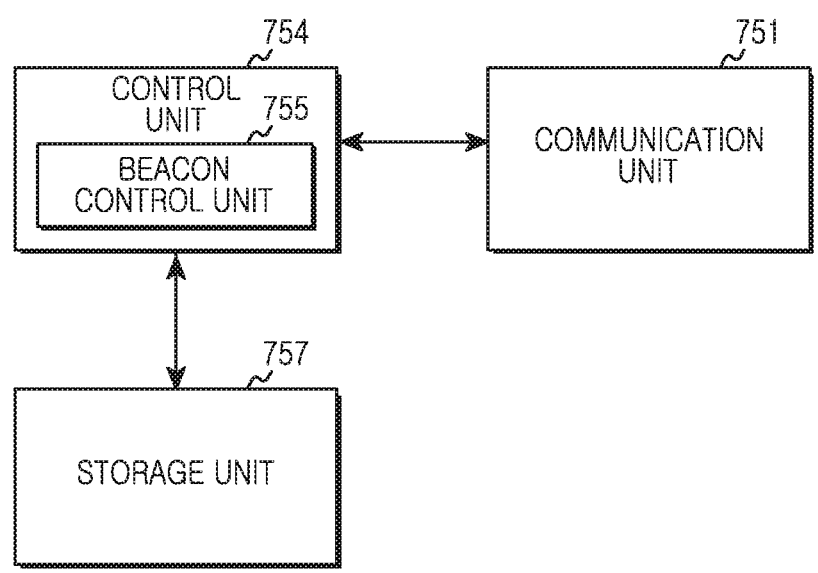
FIG. 15 illustrates a block of a terminal device according to an embodiment of the present disclosure.

FIG. 15 illustrates a block of a terminal device according to an embodiment of the present disclosure.

Referring to FIG. 15, the small base station 71 includes a communication unit 751, a control unit 754, and a storage unit 757.

The communication unit 751 performs a function for transmitting and receiving a signal through a wireless channel, such as band conversion and amplification of a signal. For example, the communication unit 751 may include a transmission filter, a reception filter, an amplifier, a mixer, an oscillator, a Digital-to-Analog Converter (DAC), an Analog-to-Digital Converter (ADC), and the like. The communication unit 751 according to an embodiment of the present disclosure may receive a beacon frame and transmit a feedback frame. Particularly, the communication unit 751 according to an embodiment of the present disclosure may receive a compressed beacon frame and transmit a compressed feedback frame. The communication unit 751 may be referred to as a transmission unit, a reception unit, a transmission/reception unit, or a communication unit.

The control unit 754 controls the overall operation of a device for controlling beamforming. The control unit 754 includes a feedback control unit 755. The feedback control unit 755 controls, for example, the device for controlling beamforming in order to perform the procedure illustrated in FIG. 16 below. According to an embodiment of the present disclosure, the operation of the control unit 754 is as follows.

The control unit 754 may control the transmission unit to perform directional transmission in each direction by using the compressed beacon frame. Further, the control unit 754 may determine an optimum transmission beam of the terminal and an optimum transmission/reception beam of the small base station by using feedback information received from the terminal.

The storage unit 717 may store necessary values of the device for controlling beamforming. According to an embodiment of the present disclosure, the storage unit 717 may store information on the optimum transmission beam.

Figure 16:
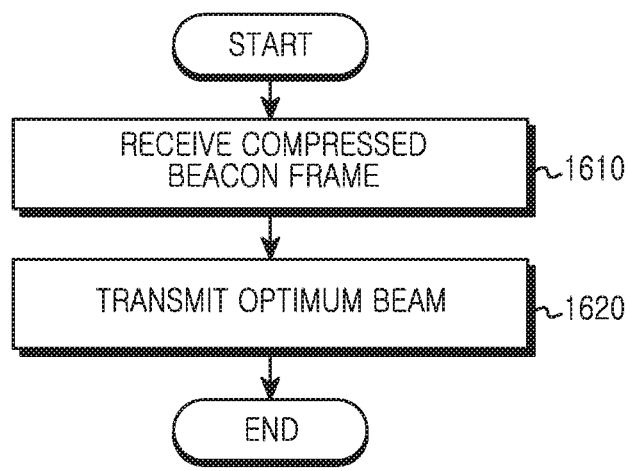
FIG. 16 illustrates the flow of an optimum beam search operation of a terminal, using a compressed beacon frame according to an embodiment of the present disclosure.

FIG. 16 illustrates the flow of an optimum beam search operation of a terminal, using a compressed beacon frame according to an embodiment of the present disclosure.

In step 1610, the terminal 75 receives compression beacon frame information. The terminal 75 may receive a compressed beacon frame from the small base station 71, and determine an optimum transmission beam according thereto.

In step 1620, the terminal 75 may transmit optimum transmission beam information. The terminal 75 may determine an optimum transmission beam based on the direction of a beam to be transmitted according to the compressed beacon frame. The terminal 75 may transmit the compressed feedback frame including the optimum transmission beam information.

Figure 17:
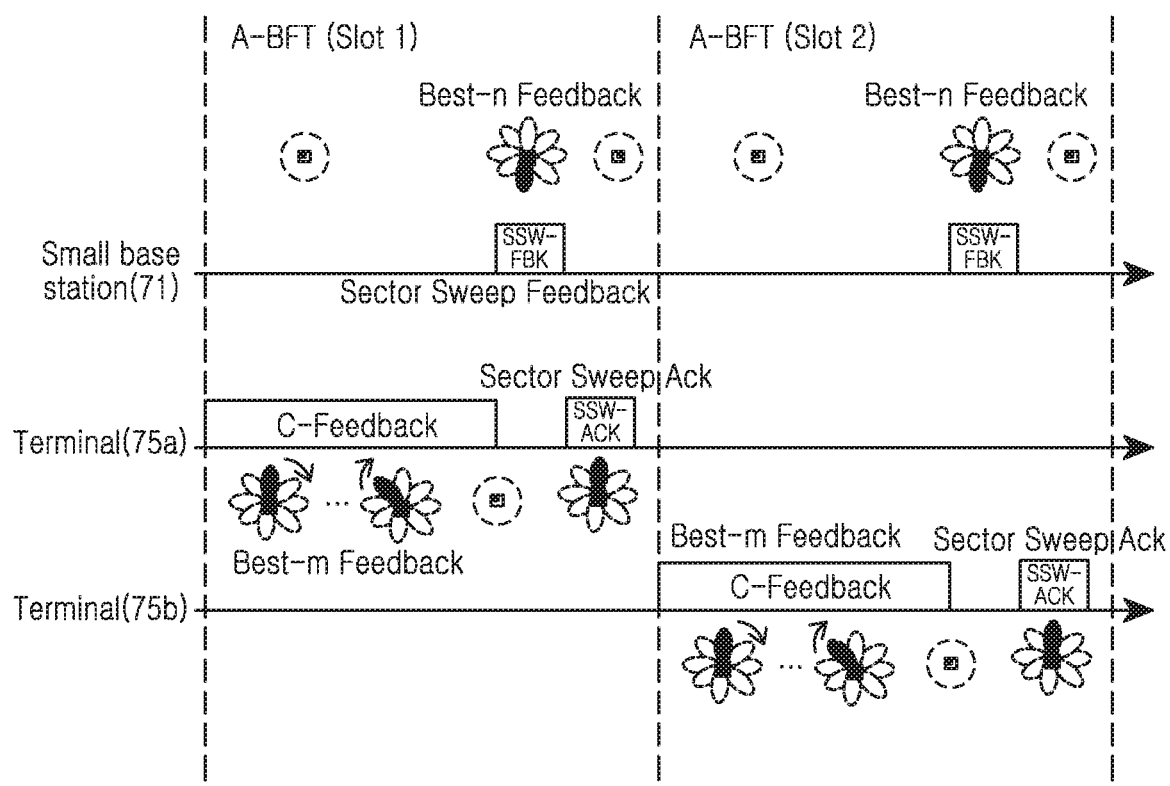
FIG. 17 illustrates the flow of an operation between a small base station and a terminal, using a compressed beacon frame according to an embodiment of the present disclosure.

FIG. 17 illustrates the flow of an operation between a small base station and a terminal, using a compressed beacon frame according to an embodiment of the present disclosure.

FIG. 17 is an example when a compressed feedback frame is used in the A-BFT section. The terminal 75 according to an embodiment of the present disclosure may perform directional transmission of an optimum transmission beam of the small base station, a CQI, and the like by using a single compressed feed frame and a single sector sweep feedback (SSW) frame, instead of performing directional transmission of the SSW frame as many times as the number of beams of the terminal 75 in a conventional manner. The small base station 71 performs reception via an omni-pattern antenna, recognizes its own optimum transmission beam, and concurrently searches for an optimum transmission beam of the terminal. The small base station adds information of the optimum transmission beam of the terminal in an SSW feedback frame and transmits the SSW feedback frame via the optimum transmission beam, and the terminal receives the SSW feedback frame via the omni-pattern antenna and recognizes an optimum transmission beam at the same time. Finally, the terminal transmits an SSW ACK via its own optimum transmission beam, and the small base station receives the SSW ACK via the omni-pattern antenna.

When the terminal 75 transmits a compressed feedback frame, the small base station 71 may not receive the compressed feedback frame via the omni-pattern antenna in order to expand uplink coverage. Instead, the small base station 71 may perform reception through a steered beam, and may repeat the reception multiple times. The small base station 71 determines an optimal transmission beam and concurrently determines an optimal transmission beam of the terminal 75. Then, the small base station 71 adds optimum transmission beam information of the terminal 75 in the SSW feedback frame and transmits the SSW feedback frame via the optimum transmission of the small base station 71, and the terminal 75 receives the SSW feedback frame via the omni-pattern antenna and determines an optimum transmission beam of the terminal 75. Finally, the terminal 75 transmits an SSW ACK via the optimum transmission beam, and the small base station 71 receives the SSW ACK via an optimum reception beam. Further, when the optimum reception beam of the terminal 75 has already been determined in the BTI interval, the operation may be performed without the SSW feedback and the SSW ACK.

Figure 18:
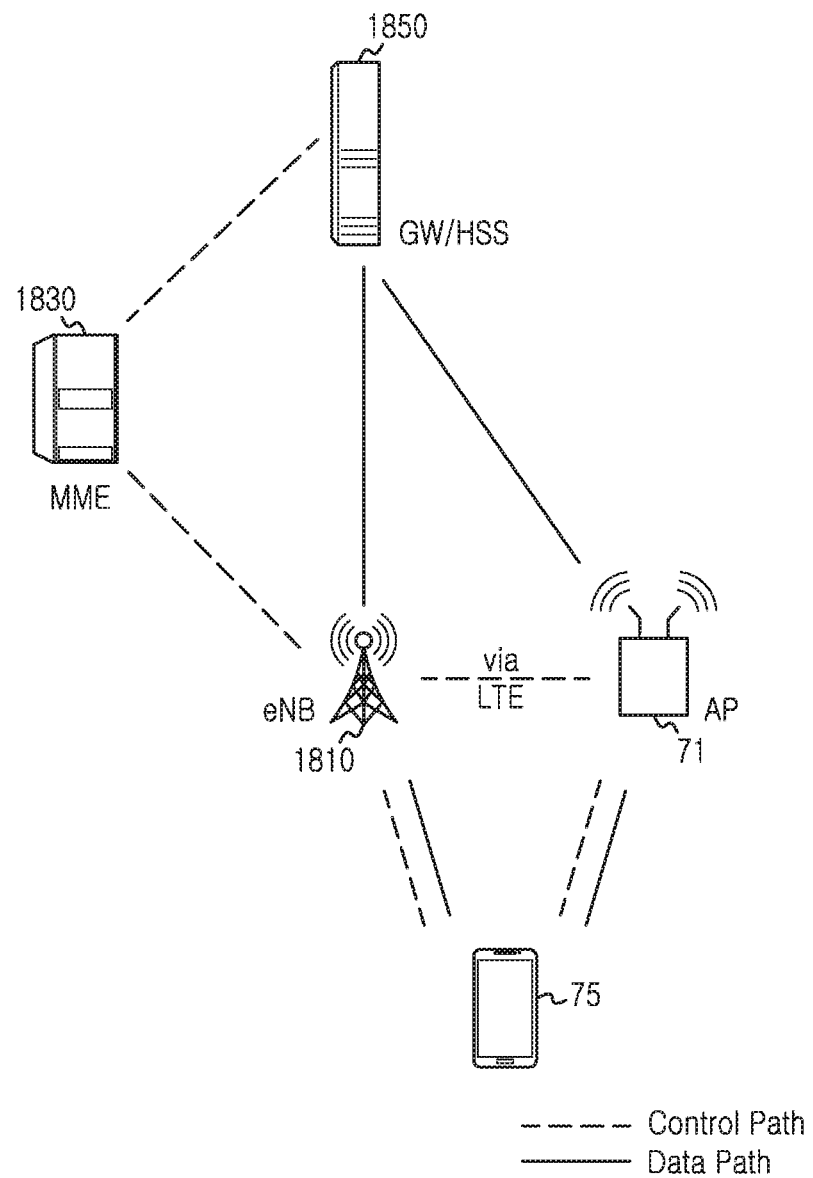
FIG. 18 illustrates an example of interworking of a small base station according to an embodiment of the present disclosure.

FIG. 18 illustrates an example of interworking of a small base station according to an embodiment of the present disclosure.

According to FIG. 18, the small base station may receive a data packet by using a private network of a business provider or a public Internet network, as a backhaul. Further, when it is assumed that the small base station receives a control signal from an eNB 1810 by using an LTE link, it may be possible to shorten a feedback time.

According to FIG. 18, when the terminals are connected with LTE and an LTE eNB 1810 functions as a relay to links of a Mobility Management Entity (MME) 1830 and a gateway (GW)/Home Subscriber Server (HSS) 1850, it may be possible to use a method in which the eNB 1810 receives an optimum transmission beam of the small base station 71, which is transmitted by the terminal 75 via the LTE links, and re-transmits the received optimum transmission beam to the small base station via the LTE links. Alternatively, it may be possible to use direct communication using the LTE link between the small base station 71 and the terminals 75.

Figure 19:
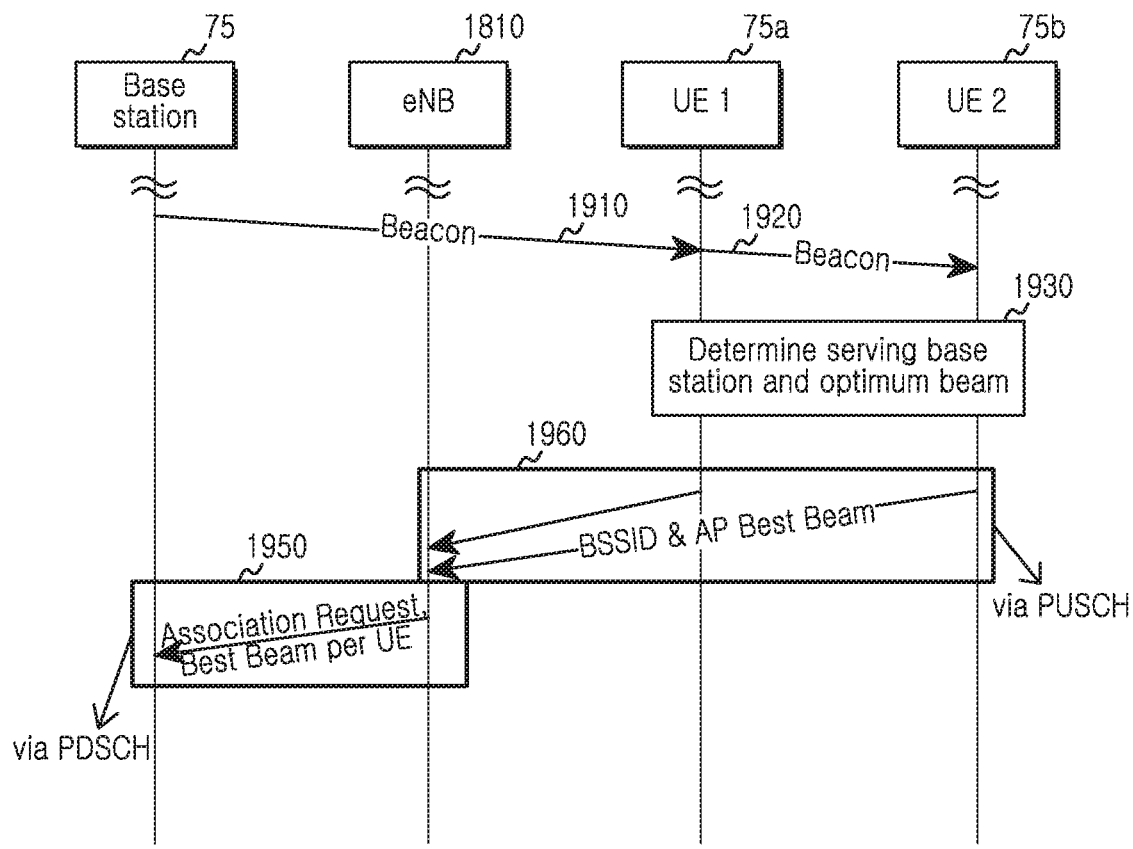
FIG. 19 illustrates the flow of information based on interworking of a small base station according to an embodiment of the present disclosure.

FIG. 19 illustrates the flow of information based on interworking of a small base station according to an embodiment of the present disclosure.

Referring to FIG. 19, the small base station 71 may interwork with the LTE eNB 1810. The small base station 71 performs directional transmission of a beacon in steps 1910 and 1920, and the terminals 75a and 75b perform omni-reception or directional reception to determine a serving small base station and an optimum transmission beam of the serving small base station in step 1930. Then, the terminals may transfer AP information and optimum transmission beam information to the LTE eNB via PUSCH in step 1940, and the LTE eNB 1810 may transfer an association request and optimum beam information of the small base station for each terminal via PDSCH of the small base station in step 1950.

Figure 20:
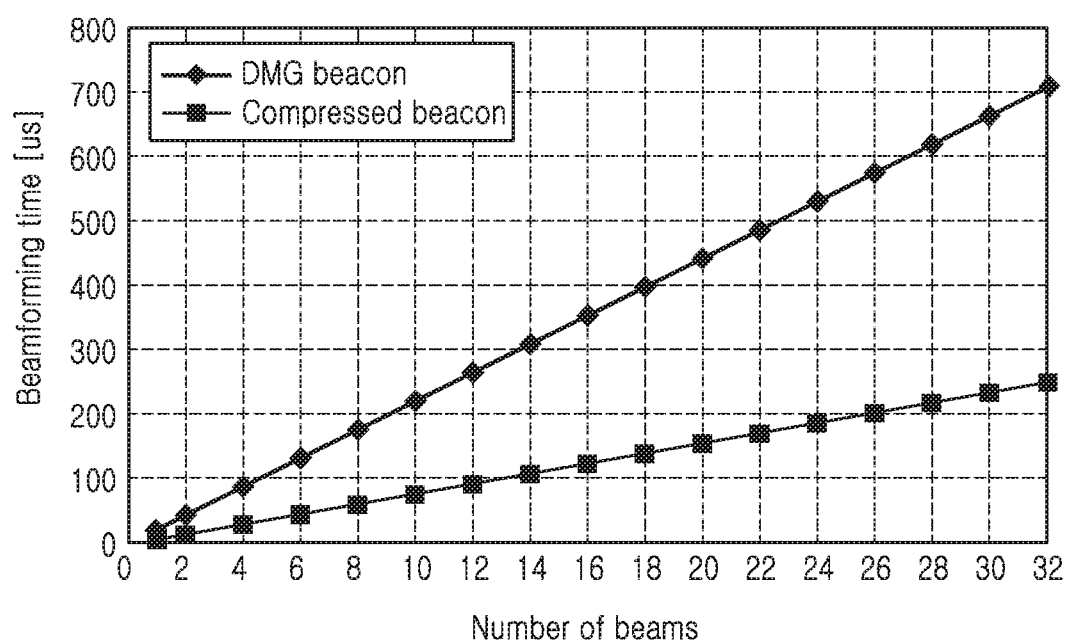
FIG. 20 shows the resultant time required for beamforming based on the number of beams of a small base station according to an embodiment of the present disclosure.

FIG. 20 shows the resultant time required for beamforming based on the number of beams of a small base station according to an embodiment of the present disclosure.

FIG. 20 shows the time required for the BTI according to the number of beams of the small base station when a compressed beacon frame is used and when a DMG beacon having a minimum length 34B is used. Referring to FIG. 20, it may be seen that the time required for the BTI is reduced by approximately 64% when the compressed beacon frame is used, compared to when the minimum DMG beacon is used. As a result, the use of the compressed beacon frame may increase a supportable movement speed with the same overhead, by reducing the time required for the BTI interval compared to when the DMG beacon is used.

Figure 21:
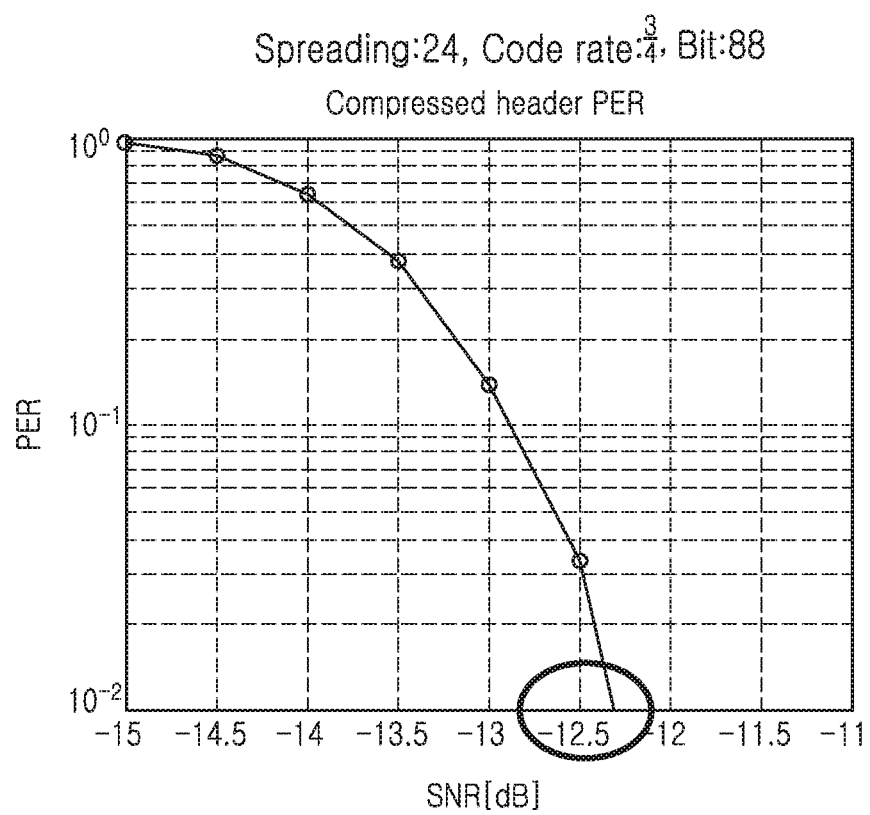
FIG. 21 shows the correlation between an SNR and a Packet Error Rate (PER) according to an embodiment of the present disclosure.

FIG. 21 shows the correlation between an SNR and a Packet Error Rate (PER) according to an embodiment of the present disclosure.

FIG. 21 shows a Packet Error Rate (PER) when spreading is performed 24 times (Code Rate: 3/4). The performance of approximately −12.3 dB is shown based on PER 0.01. Since the packet detection performance of STF is from −12 dB to 10 dB, 24-spreading, which is less than 32-spreading of an existing header, may be used. In some cases, 32-spreading of the existing header may be used while further expanding overhead.

Figure 22:
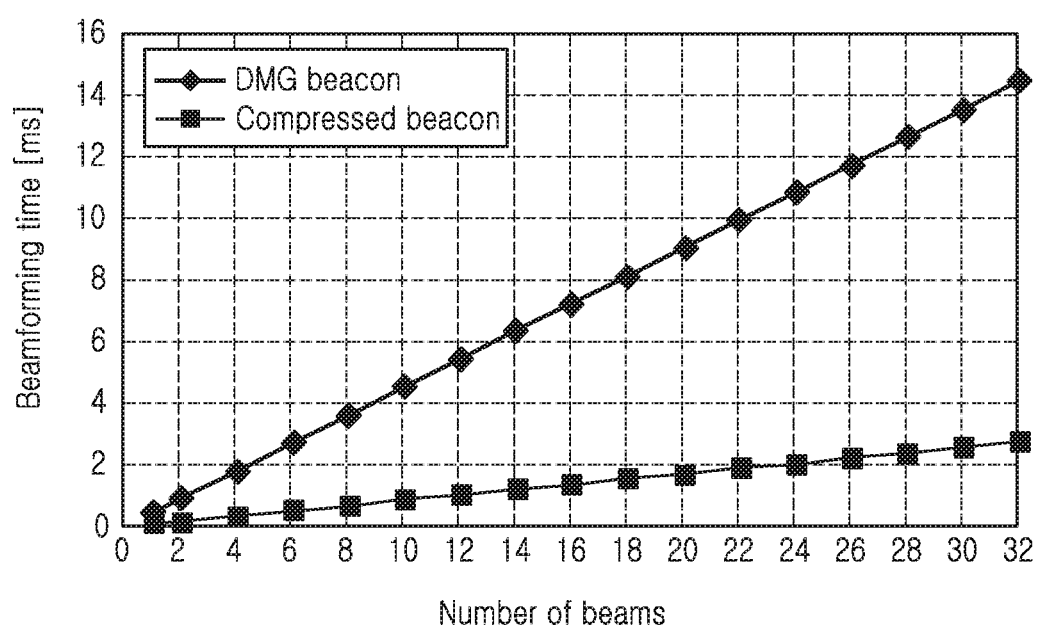
FIG. 22 shows the resultant time required for beamforming based on the number of beams of a terminal according to an embodiment of the present disclosure.

FIG. 22 shows the resultant time required for beamforming based on the number of beams of a terminal according to an embodiment of the present disclosure.

FIG. 22 shows the time required for the method according to FIG. 12, which is based on the number of beams of the terminals, and the time required when a 34B DMG beacon is used instead of a compressed beacon frame in the method according to FIG. 12. When it is assumed that the number of beams of the small base station is 16, it may be seen that the time required when the compressed beacon frame is used is reduced by approximately 64% compared to when the DMG beacon is used. As a result, if it is intended to perform beamforming in a short interval in order to support high mobility while enabling the expansion of downlink coverage, when the DMG beacon is used, there may be a case where beamforming is not fully performed according to the number of beams of the terminal, or where only beamforming is performed without performing data communication. Instead, the compressed beacon frame may be used to support high mobility while expanding downlink coverage.

The methods stated in claims and/or specifications according to embodiments may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure, as defined by the appended claims and/or disclosed herein.

The programs (software modules or software) may be stored in non-volatile memory including random-access memory, flash memory, Read-Only Memory (ROM), Electrically Erasable Programmable Read-Only Memory (EEPROM), a magnetic disc storage device, a Compact Disc-ROM (CD-ROM), Digital Versatile Discs (DVDs), other types of optical storage devices, or a magnetic cassette. Alternatively, any combination of some or all thereof may form memory in which the program is stored. Further, a plurality of such memory forms may be included in the electronic device.

In addition, the programs may be stored in an attachable storage device which may access the electronic device through communication networks such as the Internet, an Intranet, a Local Area Network (LAN), a Wireless LAN (WLAN), a Storage Area Network (SAN), or a combination thereof. Such a storage device may access a device for performing an embodiment of the present disclosure via an external port. Further, a separate storage device on the communication network may access a device for performing an embodiment of the present disclosure.

In the above-described detailed embodiments of the present disclosure, a component included in the present disclosure is expressed in the singular or the plural according to the details of the presented embodiment. However, the singular or plural expressions are selected to be suitable for proposed situations for convenience of description, and the present disclosure is not limited to the singular or plural elements. An element expressed in a plural form may be configured as a singular element, or an element expressed in a singular form may be configured in plural.

Although an embodiment has been described in the detailed description of the present disclosure, the present disclosure may be modified in various forms without departing from the scope of the present disclosure. Therefore, the scope of the present disclosure should not be defined as being limited to the embodiments, but should be defined by the appended claims and equivalents thereof.

The invention claimed is:

1. An apparatus of a base station in a wireless communication system, the apparatus comprising:
a transceiver configured to:
transmit a compressed beacon frame via each of a plurality of transmission beams of the base station;
receive, from a terminal, feedback information on a first transmission beam identified among the plurality of transmission beams of the base station; and
at least one processor configured to perform a control of a beamforming based on the feedback information,
wherein the compressed beacon frame includes a single header compressed by combining header information with data information, wherein information in the data information that is overlapped with the header information is reduced and is used for the single header, and
wherein the single header comprises a part of a beacon interval control field and a part of a basic service set identification (BSSID) field.

2. The apparatus of claim 1, wherein the compressed beacon frame comprises an identifier for indicating a presence of the single header.

3. The apparatus of claim 1, wherein the compressed beacon frame is transmitted within a beacon transmission interval (BTI) included in a beacon interval, and
wherein the feedback information is received within an association beamforming training (A-BFT) interval included in the beacon interval.

4. The apparatus of claim 1, wherein, in order to receive the feedback information on the first transmission beam, the at least one processor is further configured to receive the feedback information via each of a plurality of transmission beams of the terminal, and
wherein the at least one processor is further configured to:
identify a second transmission beam of the terminal among the plurality of transmission beams of the terminal; and
transmit information for indicating the second transmission beam of the terminal by using the first transmission beam in a direction corresponding to the feedback information.

5. The apparatus of claim 1, wherein the at least one processor is further configured to allocate slots in a number corresponding to a maximum number of beams of the terminal for reception.

6. The apparatus of claim 1, wherein the transceiver is further configured to:
transmit the compressed beacon frame without interval with two adjacent compressed beacon frames.

7. An apparatus of a terminal in a wireless communication system, the terminal comprising:
a transceiver configured to:
receive, from a base station, a compressed beacon frame transmitted via each of a plurality of transmission beams of the base station;
transmit, to the base station, a compressed feedback frame comprising information on a first transmission beam identified among the plurality of transmission beams of the base station; and at least one processor configured to perform a control of a beamforming based on the information on the first transmission beam, wherein the compressed feedback frame includes a single header compressed by combining header information with data information, wherein information in the data information that is overlapped with the header information is reduced and is used for the single header, and wherein the single header comprises a part of a basic service set identification (BSSID) field, a part of a sector sweep (SSW) field, and a part of an SSW feedback field.

8. The apparatus of claim 7, wherein the compressed feedback frame is transmitted within an association beamforming training (A-BFT) interval in a beacon interval, and wherein the compressed beacon frame is received within a beacon transmission interval (BTI).

9. The apparatus of claim 7, wherein the transceiver is further configured to:

receive a sector sweep (SSW) feedback frame comprising information on a second transmission beam among a plurality of transmission beams of the terminal; and transmit SSW acknowledge (ACK) via the second transmission beam of the terminal.

10. The apparatus of claim 7, wherein the information comprises a channel quality indicator (CQI) and an indication of the first transmission beam of the base station.

11. A method for operating a base station in a wireless communication system, the method comprising:

transmitting a compressed beacon frame via each of a plurality of transmission beams of the base station;

receiving, from a terminal, feedback information on a first transmission beam identified among the plurality of transmission beams of the base station; and performing a control of beamforming based on the feedback information, wherein the compressed beacon frame includes a single header compressed by combining header information with data information, wherein information in the data information that is overlapped with the header information is reduced and is used for the single header, and wherein the single header comprises a part of a beacon interval control field and a part of a basic service set identification (BSSID) field.

12. The method of claim 11, wherein the compressed beacon frame comprises an identifier for indicating a presence of the single header.

13. The method of claim 11, wherein the compressed beacon frame is transmitted within a beacon transmission interval (BTI) included in a beacon interval, and wherein the feedback information is received within an association beamforming training (A-BFT) interval included in the beacon interval.

14. The method of claim 11, wherein the receiving the feedback information on the first transmission beam comprises receiving the feedback information via each of a plurality of transmission beams of the terminal, and wherein the method further comprises:

identifying a second transmission beam of the terminal among the plurality of transmission beams of the terminal; and transmitting information for indicating the second transmission beam of the terminal by using the first transmission beam in a direction corresponding to the feedback information.

15. The method of claim 11, the method further comprising allocating slots in a number corresponding to a maximum number of beams of the terminal for reception.

* * * * *